United States Patent [19]

Vrcelj

[11] 4,122,147
[45] Oct. 24, 1978

[54] METHOD OF MAKING MULTILAYER CONTAINERS

[75] Inventor: Mihailo J. Vrcelj, Countryside, Ill.

[73] Assignee: The Continental Group, Inc., New York, N.Y.

[21] Appl. No.: 889,479

[22] Filed: Mar. 23, 1978

[51] Int. Cl.² .......................... B29C 3/00; B29D 9/00; B29F 5/00

[52] U.S. Cl. .................................... 264/255; 264/294; 264/323

[58] Field of Search ............... 264/126, 120, 119, 248, 264/255, 250, 294, 320, 322, 323

[56] References Cited

U.S. PATENT DOCUMENTS 3,493,645  2/1970  Sanderson et al. .................. 264/268

*Primary Examiner*—W.E. Hoag
*Attorney, Agent, or Firm*—Paul Shapiro; Joseph E. Kerwin; William A. Dittmann

[57] ABSTRACT

A thermoplastic container having multilayered sidewalls is compression molded from a multilayer billet having a first and a second thermoplastic layer, the layers being so adapted that when the thermoplastic material of the layers is heated to the heat softened state and a compressive force is imposed thereon, the layers are extruded at differential flow rates into a molding cavity whereby the fastest moving layer forms the flange and exterior surface portions of the container and the slower of the layers forms the interior surface of the multilayer container.

A multilayer container, having improved gas barrier properties, which can be sealed by double seaming to metal end closures without fracture, is obtained when the faster moving of the billet layers is comprised of a relatively flexible thermoplastic resin material and the slower moving of the layers is formed from a thermoplastic resin having incorporated therein materials which improve the gas barrier properties of the resin.

7 Claims, 9 Drawing Figures

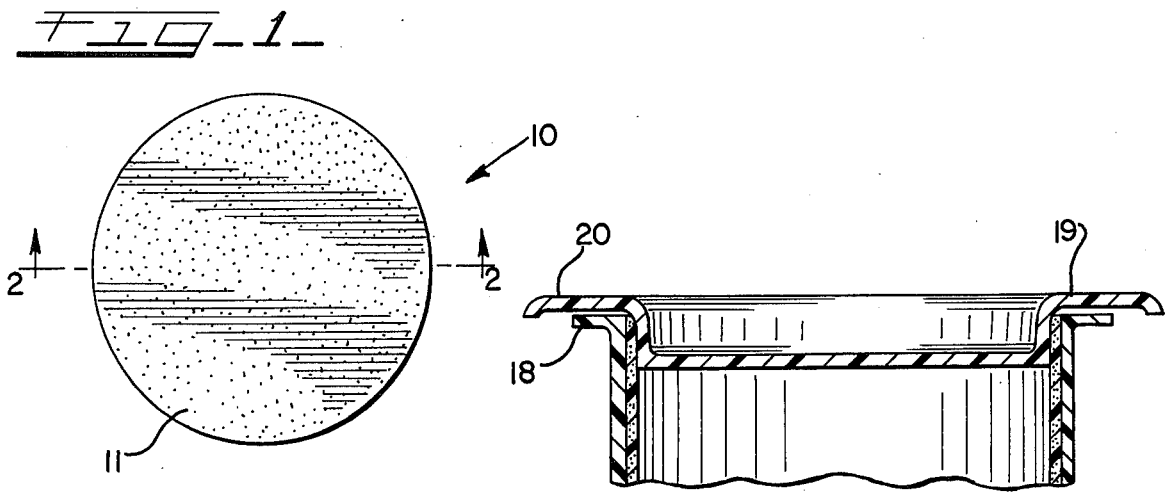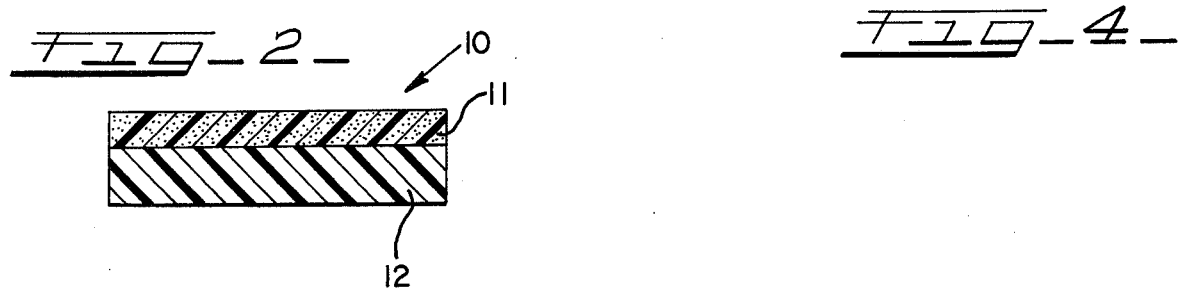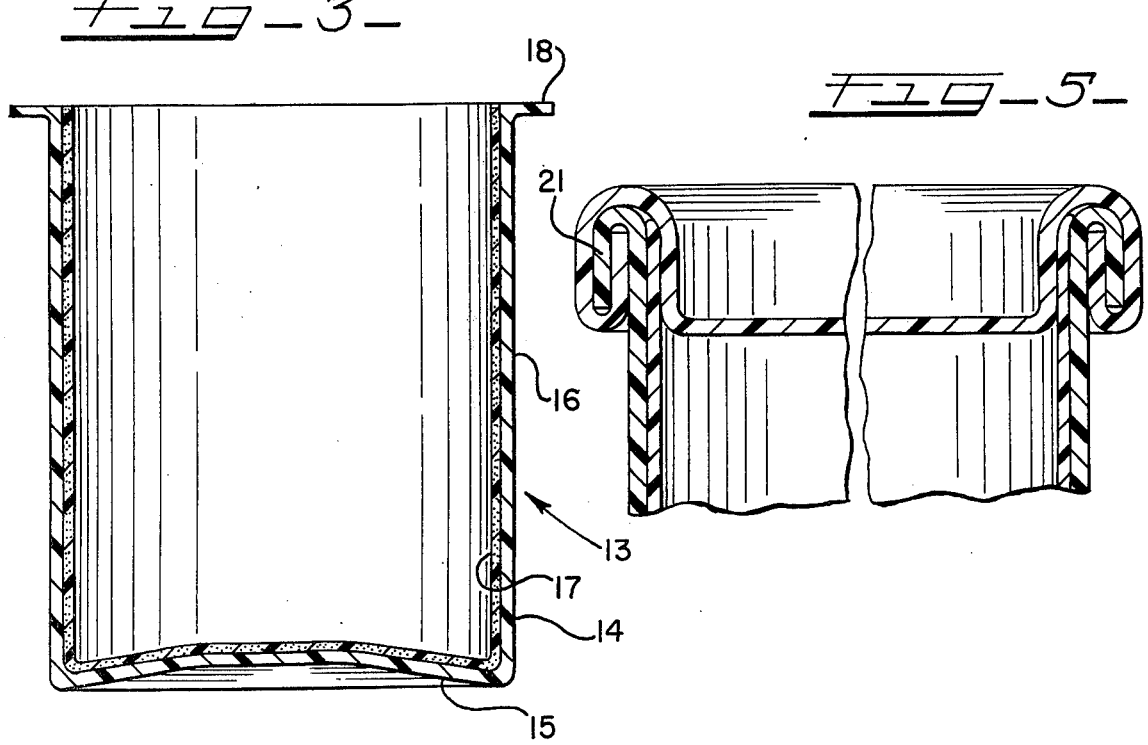

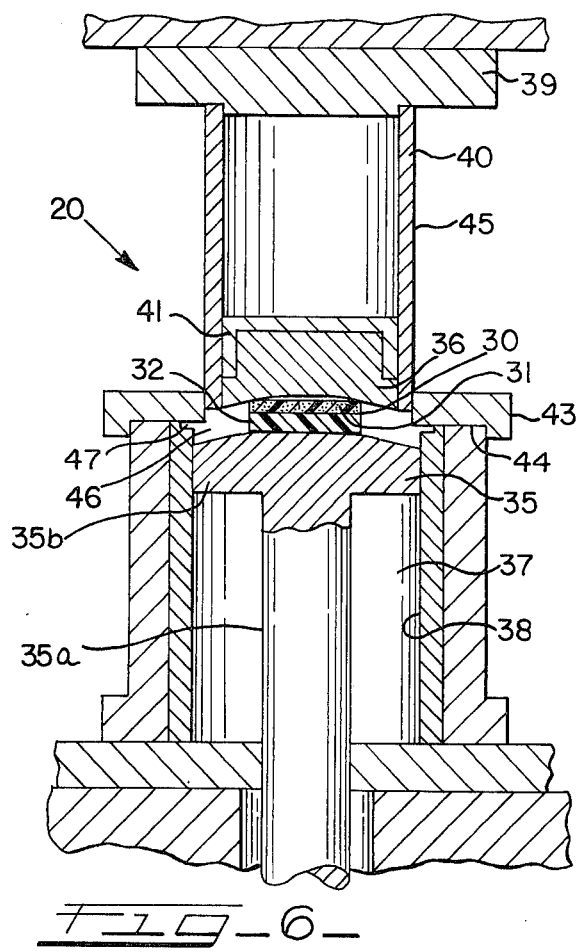
FIG_6_
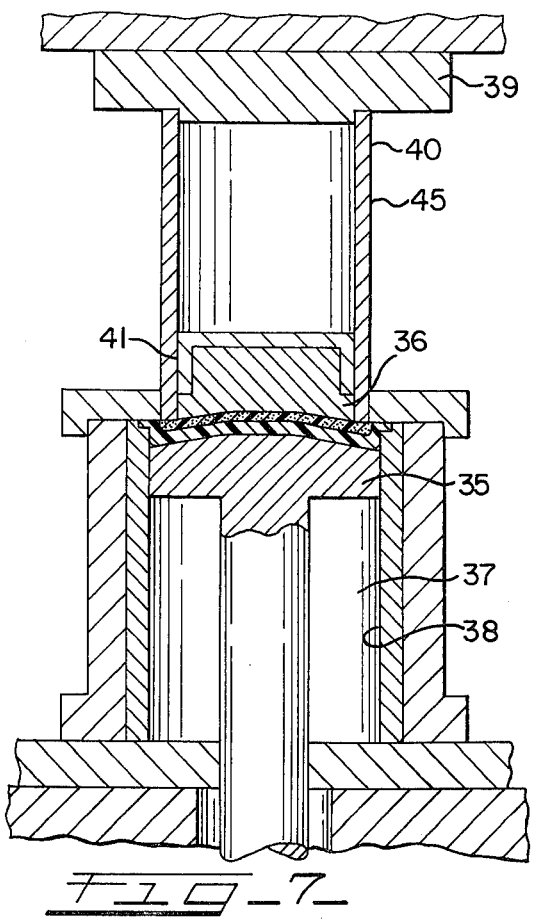
FIG_7_
FIG_9_
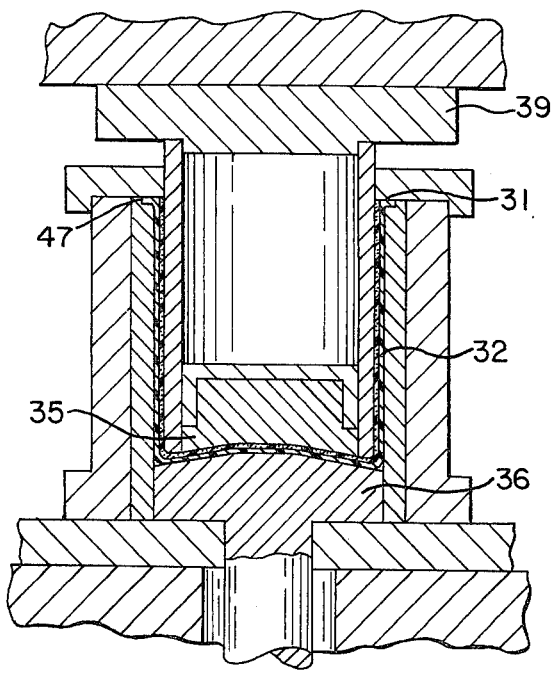
FIG_8_
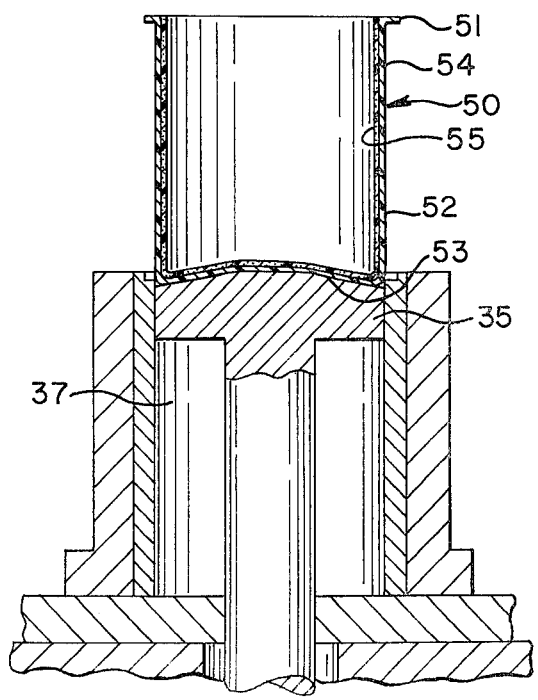

METHOD OF MAKING MULTILAYER CONTAINERS

BACKGROUND OF THE INVENTION

Field of the Invention

This invention relates to fabricating multilayer plastic containers and more particularly to fabricating multilayer plastic containers capable of being sealed with metal closures.

In the manufacture of canned foodstuffs such as meat products as ham, corned beef hash, chili and beef stew, the containers, usually metal cans, are filled with the foodstuff, covered with a metal end closure and sealed.

One of the disadvantages of canning meat products in metal containers is that the presence of the food product may cause the interior of the can to corrode, which corrosion results in contamination and deterioration of the food product.

Attempts to substitute certain inert synthetic resin materials such as polyethylene and polypropylene for metal in the canning of foodstuffs have encountered the disadvantage that such resin materials are excessively permeable to gases such as oxygen and the permeation of oxygen into the container leads to undesirable discoloration and a depreciation in the taste and qualities of the foodstuff.

The high gas permeability characteristics of synthetic resins such as polyethylene has resulted in containers fabricated from such resins being rejected in the packaging of oxygen sensitive comestibles where, due to the chemical inertness of the resin, it might otherwise be employed to great advantage.

The art has devised a number of ways to increase the gas barrier properties of polyethylene and other thermoplastic resins. Included in these methods is the fabrication of the container from a laminate formed from a plurality of layers of thermoplastic material, one of the layers being formed from a thermoplastic resin which exhibits high gas barrier properties such as vinylidene chloride polymers and acrylonitrile polymers, e.g., U.S. Pat. Nos. 3,453,173, 3,464,546 and 3,615,308. Other methods include incorporating in the thermoplastic resin a filler material such as wood flour, inorganic mineral fillers such as clay or mica, e.g., U.S. Pat. Nos. 3,463,350 and 3,668,038 or a second resin such as nylon which has gas barrier properties, e.g., U.S. Pat. Nos. 3,093,255 and 3,373,224. Although these prior art methods are effective in improving the gas barrier properties of the thermoplastic resin, serious problems are encountered when it is attempted to seal the containers molded from these modified resins with metal closures.

In the conventional method of sealing metal containers with metal end closures, the closure is conventionally secured to the upper end of the container body by means of a double seam. In the double seaming operation, the end closure having a peripheral flange is applied to the open end of a container body which is provided with a flange integral with the container body and surrounding the open end thereof. The container flange is particularly constructed and dimensioned to receive and be interfolded with the end closure flange in a double seam to secure the closure to the container body. During the double seaming operation, the body and closure flanges are rolled together to form an interlocked double seam. During this operation, these flanges are squeezed or pressed together under considerable pressure to provide a hermetic seam. Although metal end closures may be readily double seamed to plastic containers formed from unmodified thermoplastic resins, when these same resins are modified by lamination or admixture with other plastic resins or by the incorporation therein of certain fillers, the flange portions of containers formed from such modified thermoplastic resins lack the flexibility and resiliency to withstand the severe stresses encountered during double seaming with the result that the upper end portions of the container body are caused to fracture or crack during the double seaming operation.

One method proposed by the art, i.e., U.S. Pat. No. 3,923,190, to manufacture containers having improved gas barrier properties which are sealable with metal closures is to mold the container from a composite billet having an outer peripheral area composed of a thermoplastic resin and an inner central core portion composed of the thermoplastic resin modified with a material which imparts reduced gas permeability to the resin. The composite billet is compression molded into a container wherein the billet core is formed into the side and bottom wall portion of the container and the peripheral area is formed into a flexible flange surrounding the open end of the container which can be double seamed to a metal end closure without fracture as the flange is devoid of any material modification which would otherwise reduce its flexibility.

One drawback to the process disclosed in U.S. 3,923,190 is that the construction of the outer peripheral area and core of the composite billet must be made with a high degree of precision which adds substantially to the manufacturing costs of the container molded therefrom.

SUMMARY OF THE INVENTION

In accordance with the present invention there is provided a method for preparing multilayer containers having improved gas barrier properties which are double seamable with metal closures wherein the container is compression molded from a multilayer billet having a plurality of thermoplastic layers, a first of these layers being comprised of a thermoplastic resin composition exhibiting relatively high flexibility when molded, and a second of these layers being comprised of a thermoplastic resin having incorporated therein a material which reduces the gas permeability of the resin. The first and second layers, when heated to a plasticized state and subjected to a compressive force, flow at non-uniform rates, the first layer flowing at a faster rate than the second layer.

In forming the container, the billet is placed in a molding chamber and is compressed between a pair of die members with sufficient force to cause the layers of the billet to flow radially outward from between the die members at a differential rate into a mold cavity defining the sidewalls of the container. As the die members are advanced through the molding chamber, the faster flowing first layer is extruded into the mold cavity ahead of the remaining layers of the billet and forms the flange and exterior surface portions of the container whereas the slower moving second layers form the interior surfaces portions of the container.

The advancement of the die members through the molding chamber causes a continuous layer of multilayer material to be deposited and solidified within the mold cavity, the walls of which are maintained at a temperature below the solidification temperature of the extruded material. The extruded material, cooled to its solidification temperature, forms an integral solid hollow article having a multilayer side wall and bottom structure which is then ejected from the molding chamber.

DESCRIPTION OF THE DRAWINGS

FIG. 1 is a plan view of a multilayer billet formed from a plurality of thermoplastic resin layers having different flow rates when compressed in a heat softened state, one of the layers being modified with a material which increases the gas barrier properties of the resin.

FIG. 2 is a section through line 2—2 of the billet of FIG. 1.

FIG. 3 is a section through a multilayer container formed from the billet of FIGS. 1 and 2.

FIG. 4 is a fragmentary vertical cross-section illustrating a metal end closure applied to the container of FIG. 3 prior to commencement of a double seaming operation.

FIG. 5 is a view similar to FIG. 4 illustrating the container of FIG. 4 after the end closure has been double seamed to the container body.

FIG. 6 is the first of a series of section views which show a method for molding the multilayer billet of FIG. 1 into the container of FIG. 3, the billet being positioned between a pair of die members in a molding chamber prior to initiation of the molding operation.

FIG. 7 shows the die members partially advanced within the molding chamber, the faster flowing of the compressed layers of the billet filling a groove provided in the molding chamber to form the container flange.

FIG. 8 shows the die members fully advanced within the molding chamber to form a flanged container from the billet.

FIG. 9 illustrates the separation of the die members after molding of the container is completed and immediately before ejection of the container from the molding chamber.

Referring now to the drawings, FIGS. 1 and 2 show a multilayer billet 10 having an upper layer 11 formed of a thermoplastic resin modified with a material which increases the gas barrier properties of the resin and a lower layer 12 formed of thermoplastic resin not so modified. The layers of the multilayer billet 10 are formulated so that layers do not flow uniformly when heated to a plasticized state and compressed. Thus the lower layer 12 is formulated so as to be extruded ahead of the upper layer 11 when the billet 10, heated to the plasticization temperature of the thermoplastic resin of which the billet is comprised, is subjected to a compressive force.

In FIGS. 3, 4 and 5, there is shown a container 13 formed from multilayer billet 10 having a body 14 and an integral bottom portion 15 having a multilayer structure, the exterior surface 16 being formed from the lower layer 12 of the billet 10 and an interior surface 17 formed from the upper layer 11 of the billet 10 and an outwardly extending flange 18 formed of thermoplastic resin derived from the faster moving lower layer 12 of the billet 10.

A metal end closure 19 having a peripheral flange 20 is applied to the open end of the container 13. The peripheral flange 20 of the end closure 19 is interfolded with the flange 18 of the container 13 to form a double seam 21 by means not shown by which the end closure 19 is sealed and joined to the container body 13. The sealed container is constructed of a metal end closure 19 sealed to a container body 13 having a multilayer wall structure in which the exterior wall 16 and flange portions 18 of the container are formed from an unmodified thermoplastic resin and the interior wall portion 17 is formed from a thermoplastic resin modified to have reduced gas permeability. As the thermoplastic flange 18 of the container 13 is interfolded with the gas impermeable metal flange portion 20 of the end closure 19, the sealed container does not have any exposed unmodified plastic portion.

Referring now to FIGS. 6-9 in FIG. 6, there is generally shown a molding apparatus or press 29 which is suitable for carrying out the method of the invention. A suitably shaped multilayer billet 30 is placed in the press 29 between opposed lower die member or die pad 35 and upper die or punch 36. The layer cross-section of the billet exhibits a non-uniform velocity profile when heat softened and compressed, the billet being constructed of an upper layer 31 comprised of a thermoplastic resin modified with a second material adapted to increase the gas barrier properties of the resin and a lower layer 32 comprised of a thermoplastic resin of relatively high gas permeability and high flexibility and which, when compressed in a heat softened state, flows at a rate faster than the upper layer 31 subjected to the same molding conditions.

The pair of die members 35, 36 are adapted to advance through a molding chamber 37. Means (not shown) such as conventional hydraulic or mechanical means are provided for effecting relative movement of the die members 35, 36 toward and away from each other within the interior walls 38 of the molding chamber 37.

Upper die member 36 is comprised of a support plate 39 having secured thereto die sleeve 40 and die cap 41 mounted and secured to the lower end of the sleeve 40.

The interior of molding chamber 37 has a predetermined transverse dimension exceeding that of the upper die 36 to permit the die sleeve 40 and the interior walls 38 of the molding chamber to be spaced from one another during the molding cycle. To provide this desired spacing, the molding chamber is provided with a ring cap 43 mounted on the upper rim 44 of the molding chamber 37. The ring cap 43 has an orifice of sufficient size for sliding contact with the outer peripheral wall surface 45 of the sleeve 40. The annular clearance between the sleeve wall surface 45 and interior molding chamber wall 38 defines a cavity 46 having the shape and dimensions desired for the sidewall of the container to be molded.

The lower die 35 has a stem 35a and a head 35b having a surface which matches the surface of the die cap 41. The die 35 is slidably disposed axially within the molding chamber 37 for reciprocal telescopic movement within the chamber. The lower die 35 which acts as a backing member during the compression of the multilayered billet also serves as an ejector for the molded container after its formation in the molding chamber 37.

The die stem 35a is connected to a suitable mechanism (not shown) for advancing and retracting the die pad 35 in the molding chamber 37. Such mechanisms are well known to the art and may comprise cam mechanisms, hydraulic mechanisms or other suitable means for advancing and retracting die members.

The molding chamber 37 is provided with a peripheral groove or recess 47 formed in the interior rim portion of the molding chamber. The groove 47 is adapted to receive the faster moving inner layer 32 of unmodified thermoplastic resin from the multilayer billet which is extruded therein during the molding operation to form the seaming flange of the multilayer container. The dimensions of the recess 47 are determined by the flange design that is desired in the multilayer container.

The lower die 35 is also provided with hydraulic pressure regulator means (not shown) adapted to be responsive to pressure between the upper and low die members 35, 36 to cause a pressure differential between the die members in response to a pre-determined compression level between the die members. Thus, when the pressure developed between die members 35 and 36 reaches a level of compressive force which will cause radial flow of the layers of the heat-softened billet 30 disposed therebetween, the pressure regulator maintaining the lower die 35 in a stationary position is actuated to lower the pressure exerted on the die 35 to permit the gradual advancement of the opposed die members through the molding chamber 37.

In operation, a suitably shaped billet 30 having a multilayer structure composed of a heat-softenable thermoplastic material is first formed having a diameter smaller than the die cap 41 and of such total thickness as to provide the requisite amount of material required for the formation of the desired multilayer container.

As shown in FIG. 6, the billet 30 is placed on the surface of the lower die 35 raised to a first position at the upper rim 44 of the molding chamber. Advantageously, the lower die 35 is adjusted so that when the billet 30 placed thereon, the fastest moving layer 32 of the billet is situated just above the groove 47 to insure that the material extruded into the groove will be substantially derived from the inner layer 32 of the billet 30. The billet is preferably heated to a uniform softening temperature by suitable heating means (not shown) prior to its placement on the die member 35.

The upper die 36 is then lowered through the die ring and into contact with the upper surface of the billet 30 to the closed die position illustrated in FIG. 6. Upon engaging the surface of the upper layer, the die cap 41 is forced downward into the billet 30. At this point, the lower die 35 is maintained in a stationary position by a force exerted on the die 35 equal to the force being exerted on the billet 30 by the upper die 36. The pressure on the billet 30 is increased until sufficient compressive force is exerted on the billet between the dies 35 and 36 to initiate the radial flow of the faster flowing thermoplastic material of the lower layer 32 of the billet outwardly from between the dies into the groove 47.

As shown in FIG. 7, after initiation of the extrusion of billet lower layer material 32 into the groove 47, the force exerted on the die 35 is incrementally lowered to establish a differential pressure between the die members 35 and 36 to permit the dies to advance downwardly together in the molding chamber 37 while maintaining a compressive force on the billet 30 between the dies to provide a continuous differential lamellar extrusion of the upper and lower layers of the billet material to fill the cavity 46.

As shown in FIG. 8, as the lamellar material is extruded and fills the cavity 46, coolant circulated through the walls of the molding chamber (by means not shown) chills and solidifies the extruded material to form the multilayered bottom and sidewalls of the container. As the lower layer of the billet flows faster than the upper layer, the lower layer forms the outside surface of the container walls, while the modified upper layer forms the interior gas barrier layer of the container. Rapid cooling of the lamellar extrudate on the walls of the chamber has the simultaneous effect of solidifying the extrudate as well as promoting the release of the extrudate from the chamber walls.

As shown in FIG. 9, after extrusion of the billet material is completed by the advancement of the die members 35, 36 through the molding chamber 37, there is formed container 50 having a flange portion 51 formed of unmodified thermoplastic material and sidewalls 52 and bottom portion 53 having a multilayered structure composed of an exterior surface 54 of unmodified thermoplastic resin and an interior surface 55 of a thermoplastic resin modified to have increased gas barrier properties. Upon formation of the container 50, the upper die 36 is retracted from the molding chamber 37 to the fully opened position. The die pad 35 is advanced upwardly through the molding chamber 37 to eject the container 50 from the molding chamber 37. After ejection of the container 50, the die pad 35 is in position to receive another multilayer billet and immediately repeat the molding cycle.

The multilayer containers ejected from the molding chamber are ready for immediate packaging and double seaming operations and require no trimming or other treatment after formation.

PREFERRED EMBODIMENTS

The multilayer billet from which plastic containers are formed in accordance with the present invention may be constructed of any thermoplastic material which heretofore has been unsuitable for the manufacture of containers used for packaging applications where low permeability to gases such as oxygen, carbon dioxide and water vapor are required. Illustrative examples of such thermoplastic resins are polyvinyl chloride, acrylonitrile/butadiene-styrene copolymers (ABS), polystyrene and olefin polymers, such as polyethylene, polypropylene, poly-1-butene, poly-4-methylpentene-1, and other homopolymers and copolymers of similar mono-1-olefins having up to 8 carbon atoms per molecule.

The thermoplastic resin may be reinforced with filler materials, such as natural organic fibrous materials in finely divided form, especially wood particles such as sawdust and wood flour, mineral fillers such as kaolin and $CaCO_3$, and siliceous fillers such as silica, calcium silicate, aluminum silicate at loadings of 1% to 60% by weight.

To reduce the gas permeability of the thermoplastic resin, a second resin material which possesses high gas barrier properties is incorporated therein at concentrations of 20 to 60% by weight, such resins including nylon, acrylonitrile/styrene copolymers having acrylonitrile contents of greater than 60% by weight and vinylidene chloride polymers (saran) such as polyvinylidene chloride, vinylidene chloride/vinyl chloride and vinylidene/acrylonitrile copolymers.

Alternatively or in addition to the incorporation of a barrier resin in the thermoplastic resin, inert lamellate materials such as mica, glass flakes, talc, at loadings of 30 to 90% by weight, may be incorporated in the thermoplastic resin layer to lower the gas permeability of the resin composition. Materials having a lamellate configuration are particularly advantageous in the manufacture of containers having high gas barrier properties by the process of the present invention, as the compressive forces exerted on the billet cause lamellation of the filler, with the lamellate being laterally dispersed in an imbricated arrangement within the resin matrix whereby high gas barrier values at relatively low loadings of the lamellate filler are obtained. Imbrication of the lamellate particles has been found to increase inversely with the thickness of the layer being compressed, with the result that for the same lamellate loading, e.g., 50% mica, higher gas barrier properties are observed with containers fabricated from billets in which the lamellate filled layer is of a thickness of 15 mils as compared with 30 mils.

The number of layers in the billet is not critical to the invention and billets having multiple layers substantially in excess of two, e.g., 3 to 20 layers, may be used in the practice of the present invention. The critical feature of the invention is that the layers of the billet move non-uniformly when compressed and that the fastest flowing layer when solidified is flexible enough to be double seamed with a metal closure.

Further, it is not critical to the invention that the layers of the billet inherently undergo differential flow speeds when compressed in a heat softened state. Thus, where the flow rates of the layers are substantially the same, i.e., the layers exhibit plug flow, and the heat softened layers will undergo the same rate of radial extrusion when compressed, the layers of the multilayer billet may be induced to flow at differential rates by adjusting any of the parameters known to effect the flow rate of thermoplastic resins, as for example, unequal heating of opposed billet surfaces prior to molding, maintaining the die members used for compression at unequal temperatures and/or lubricating the die member in contact with the surface of the billet layer whose rate of radial extrusion is to be accelerated.

The billet used in accordance with the present invention can be any shape such as circular, square or polygonal. The actual dimensions of the billet will be determined by experimentation with the particular molding chamber and die member configuration and the total volume of the billet will be that which is sufficient to meet the dimensional requirements of the desired container.

A method for preparing the billet is to compact separate layers of resin powders of different composition which may contain fillers or other gas barrier materials admixed therewith. In preparing such billet, the layers are formed by alternatively charging and compressing the different powder mixtures of which the multilayered billet is to be formed in a compacting chamber at relatively high pressures, e.g., 6,000 to 30,000 pounds per square inch (psi), to the desired shape and contour of the billet. Thereafter, the compacted layers are heated to a temperature of about 10° to 175° F. above the melting temperature of the thermoplastic resins for a time sufficient to fuse the resin particles. The so-prepared, heated billet is then ready for subsequent compression molding to form the multilayer container.

The invention is further illustrated by the following Example:

EXAMPLE

Multilayer billets were formed by first feeding to a compacting device 15.1 grams of mixture of powders containing 68% by weight polyethylene powder having a density of about 0.95 g/cc and a median particle diameter of about 25 microns, 30% by weight $CaCO_3$ particles having a median particle diameter of about 11 microns and 2% by weight $TiO_2$ pigment to form the lower layer of a billet. To the top surface of the lower layer was applied 17.3 grams of a mixture of powders composed of 58% by weight of the polyethylene powder, 40% by weight mica having a median particle diameter of about 265 microns and 2% by weight $TiO_2$ to form the upper layer of the billet. The multilayered article was compacted at about 6000 psi into 2.5 inch diameter discs having a thickness of about 400 mils. The upper layer had a thickness of about 210 mils and the lower layer had a thickness of about 190 mils. The discs were heated in a heating device to about 360° F. for about 8 minutes under ambient pressure conditions. At the end of the heating period, the heated discs were placed in a compression molding apparatus of the type described in FIGS. 6–9 between the pair of opposed die members 35, 36 of the apparatus. The lower die member was heated to 200° F. and the upper die member was at about 340° F. The upper die 36 was circular in shape and had a diameter of 2.934 inches. The lower die 35 had a diameter of 3.001 inches. The diameter of the molding chamber 37 was 3.005 inches and the clearance between the edge of the die 36 and interior wall of molding chamber when the die 36 was lowered into the molding chamber was 0.032 inch. The vertical length of the molding chamber 37 was cooled to 55°–75° F. by circulating water through internal channels (not shown) contained in the molding chamber walls.

The heated multilayer disc was placed centrally on the surface of the die pad 35 which was raised level with the groove 47 of the molding chamber 37 so that the interface between the lower and upper layers of the billet was 40 mils above the recess 47. The upper die 36 was forced into contact with the lower die 35, it having been predetermined that when the compressive force between the two die members reached about 7000 psi, radial flow of the lower polyethylene/$CaCO_3$ layer would be initiated. The apparatus was adjusted so that when the compressive force exerted on the disc reached about 40,000 psi, downward movement of the lower die would be initiated at a speed of about one foot per second.

Compression of the disc was effected with a 30 ton mechanical press. Compression of the disc caused a portion of the lower layer of the billet to be radially extruded into the recess 47, ahead of the upper layer.

Two seconds after placement of the disc in the apparatus, a multilayer cylindrical hollow container having a flange thickness of 20 mils and a sidewall thickness of 32 mils constructed of a polyethylene/$CaCO_3$ outer layer and a polyethylene/mica inner layer and a bottom wall thickness of 35 mils of the same construction as the sidewall was ejected from the molding chamber 37. The container flange could be double seamed with a steel end closure without fracture.

The oxygen leak rate of the multilayer container was measured by closing the open end by double seaming with a metal end and attaching the closed container to a Mocon Oxtran 100 instrument which measures the oxygen leak rate.

Containers for the packaging of oxygen sensitive foodstuff generally require an oxygen leak rate of about 0.1 to about 0.5 cc/100 in.$^2$ 24/hr. atmos. at 73° F. The oxygen leak rate of containers fabricated from the multilayer disc was determined to be about 0.18 cc/100 in.$^2$ 24/hr. atmos. at 73° F.

By way of contrast, the oxygen leak rate of containers fabricated from a billet formed from mixture of polyethylene and 30%–70% by weight $CaCO_3$ is in the range of 0.6–0.9 cc/100 in.$^2$ 24/hr. atmos. at 73° F.

What is claimed is:

1. A process for the manufacture of a thermoplastic container having integral multilayer bottom and sidewalls, the top of the sidewalls being circumferentially provided with a single layer flange portion adapted to be interfolded with a metal closure for seaing, the process comprising:

preparing a multilayer billet having a first layer and a second layer, both of the layers being initially coextensive, each of said layers having an integral structure, the composition of said layers being such that when the layers are heated to a heat softened state and a compressive force is imposed thereon by a pair of dies the first layer is extruded from between faces of said dies at a faster flow rate than that of the second layer;

disposing said billet between upper and lower said dies, said layers being arranged one above the other between the dies;

heating the billet between said dies to cause the extrusion of the heat softened layers into a mold cavity surrounding one of said dies whereby the faster moving layer forms the flange and exterior surface portions of the container and the slower of the layers forms the interior surface portion of the container.

2. The process of claim 1 wherein the thermoplastic resin is polyethylene.

3. The process of claim 1 wherein the slower moving layer is a mixture of polyethylene and a vinylidene chloride polymer.

4. The process of claim 1 wherein the first of the billet layers is comprised of a flexible thermoplastic resin material and the slower moving of the layers is formed from a less flexible thermoplastic resin having incorporated therein materials which improve the gas barrier properties of the resin.

5. The process of claim 4 wherein the faster moving layer is comprised of a mixture of high density polyethylene and $CaCO_3$.

6. The process of claim 4 wherein the slower moving layer is comprised of a mixture of high density polyethylene and mica.

7. The process of claim 6 wherein the slower moving layer has a thickness less than the remaining layers of the billet.

* * * * *